(12) United States Patent
Andrews

(10) Patent No.: US 6,354,247 B1
(45) Date of Patent: Mar. 12, 2002

(54) METHOD AND APPARATUS FOR CONTROLLING AN ANIMAL

(76) Inventor: Stuart John Andrews, 17 Bendigo Street, Fisher, ACT 2611 (AU)

( * ) Notice: Subject to any disclaimer, the term of this patent is extended or adjusted under 35 U.S.C. 154(b) by 0 days.

(21) Appl. No.: 09/582,769

(22) PCT Filed: Apr. 1, 1999

(86) PCT No.: PCT/AU99/00257

§ 371 Date: Jun. 30, 2000

§ 102(e) Date: Jun. 30, 2000

(87) PCT Pub. No.: WO99/51088

PCT Pub. Date: Oct. 14, 1999

(30) Foreign Application Priority Data

Apr. 3, 1998 (AU) .............................................. PP 2794

(51) Int. Cl.[7] .............................................. A01K 15/02
(52) U.S. Cl. ...................................... 119/818; 119/816
(58) Field of Search ............................... 119/818, 712, 119/792, 793, 816

(56) References Cited

U.S. PATENT DOCUMENTS

| | | | | |
|---|---|---|---|---|
| 216,705 A | * | 6/1879 | Smith | |
| 444,387 A | * | 1/1891 | Harris | |
| 580,965 A | * | 4/1897 | Weathers | |
| 597,317 A | * | 1/1898 | Ellsworth | |
| 2,534,727 A | * | 12/1950 | Moyle | |
| 2,613,932 A | * | 10/1952 | Manners | |
| 3,994,264 A | * | 11/1976 | Flynt | |
| 4,528,944 A | | 7/1985 | Reed et al. | |
| 4,655,172 A | | 4/1987 | King | |
| 4,964,369 A | * | 10/1990 | Sporn | |
| 5,511,515 A | | 4/1996 | Brown et al. | |

FOREIGN PATENT DOCUMENTS

FR    2 304 284    3/1975

* cited by examiner

Primary Examiner—Michael J. Carone
Assistant Examiner—Yvonne R. Abbott
(74) Attorney, Agent, or Firm—Mathews, Collins, Shepherd and Gould, P.A.

(57) ABSTRACT

Apparatus to assist a person in controlling an animal, e.g. a dog, on a leash (2) attaches the leash to a loop (26) in the middle of a length of elasticised cord ("shock cord"), the ends (28) of which are attached just above the hocks of the rear legs of the dog. The shock cord runs freely through a central ring (16) on the back of the animal and then through guide rings (14) on each side of the body, these guide means being held in place by a harness (4) having straps (8, 10) around the body and chest of the animal. When the dog pulls on the leash a reactive tensile force is set up in the cord (6) which has the effect of resisting rearward movement of the hind legs and may even result in the dog sitting.

9 Claims, 1 Drawing Sheet

METHOD AND APPARATUS FOR CONTROLLING AN ANIMAL

TECHNICAL FIELD

This invention relates to a method and apparatus for controlling an animal, particularly a dog.

BACKGROUND ART

Many people have difficulty in controlling or training or restraining (herein generically referred to as controlling) their dog's pulling or lunging when it is on a leash. This is particularly true in relation to larger dogs.

Choker chains have been widely used for the purpose of controlling a dog on a leash. However, many dogs continue pulling despite the choker chain. Furthermore, many people are not comfortable with using choker chains as they are concerned that the chain may injure the dog.

DISCLOSURE OF INVENTION

In one aspect the invention resides in apparatus for assisting a person in controlling an animal, the apparatus including:

a harness including guide means;

running gear in use extending substantially forwardly from the person controlling the animal to the guide means and then substantially rearwardly to the animal's hind legs for attachment adjacent each of the hocks such that the pulling of the animal causes a forwardly directed force to be applied to each of the animal's hind legs.

In another aspect the invention resides in a method for assisting a person in controlling an animal including:

utilizing running gear to apply a forwardly directed force to each of the animal's hind legs in response to the animal pulling or lunging away from the person.

BRIEF DESCRIPTION OF DRAWINGS

In order that this invention may be more easily understood and put into practical effect, reference will now be made to the accompanying drawings which illustrate a preferred example of the invention, wherein.

BEST MODE

Figure 1:
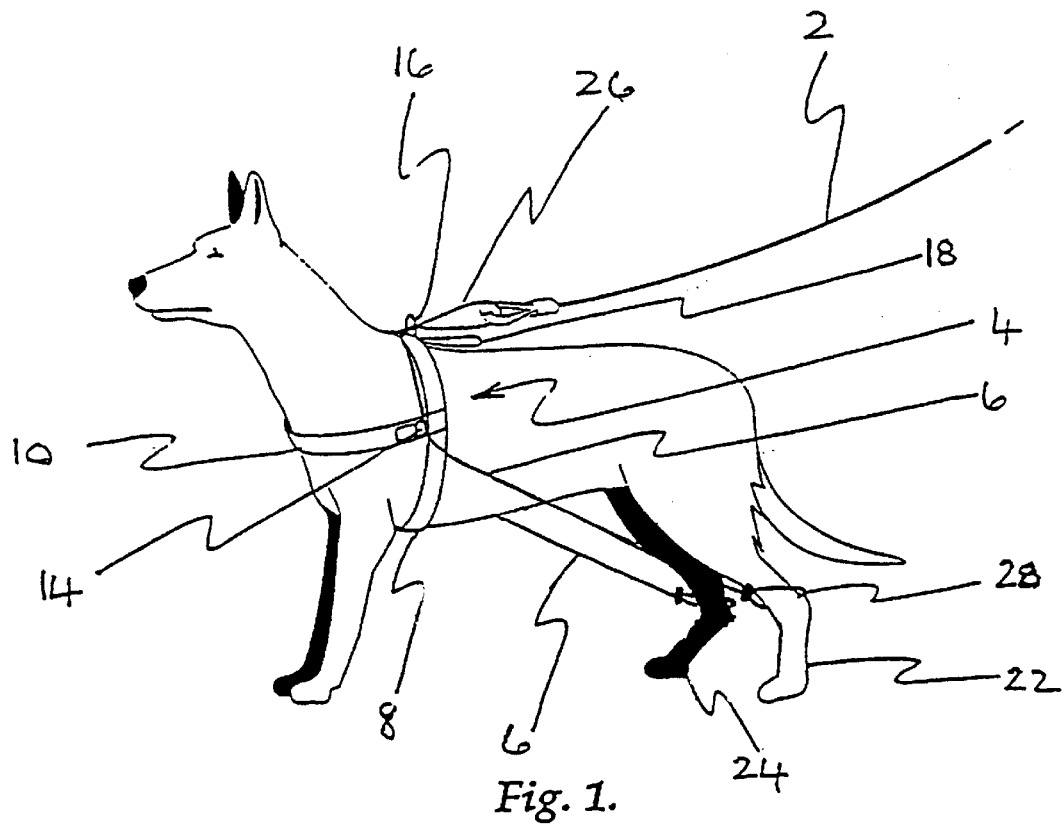
FIG. 1 is a side view of harness apparatus constructed in accordance with the invention and positioned on a dog.
Figure 2:
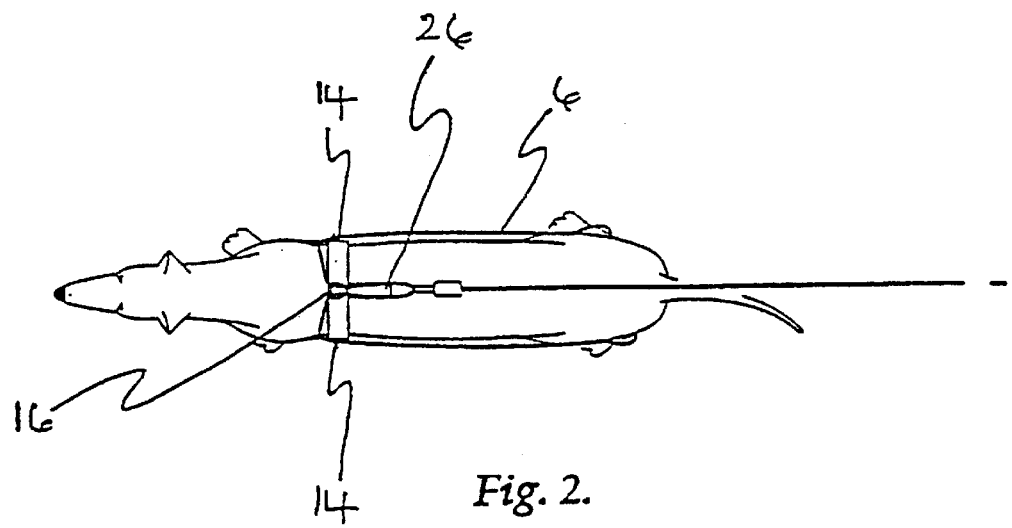
FIG. 2 is a plan view of the harness and dog shown in FIG. 1.

Referring to FIGS. 1 and 2, the example of apparatus constructed in accordance with this invention includes a conventional dog leash 2, a harness 4 and running gear in the form of a length of shock cord 6. For the reader who is unfamiliar with this term, "shock cord" comprises an elastic core and a braided sheath which enables limited resilient stretching.

The harness 4 is fabricated from webbing, and includes a body strap 8 which encircles the body portion of the dog immediately behind the front legs of the dog, and a chest strap 10 which extends across the chest of the dog and which is stitched at its respective ends to the body strap 8.

Both the body strap 8 and the chest strap 10 are adjustable to accommodate different sizes of animals and both are provided with quick release devices (not shown) to facilitate positioning of the harness 4 on a dog and to facilitate release of the harness from the dog.

The chest strap 10 is provided with guide means in the form of a pair of metal anchor D rings 14 adjacent its two ends at each side of the dog, and the body strap 8 is provided with central guide means in the form of a metal anchor D ring 16 adjacent the upper back portion of the dog.

Extending rearwardly from the body strap 8 adjacent the D ring 16 is a closable storage pocket portion 18 for storage of the cord 6 when not in use.

The cord 6 extends from just above the hock of the left rear leg 22 of the dog through the left hand side guide means 14, through the central guide means 16 to the leash 2, then back through the central guide means 16, and through the right hand side guide means 14 to just above the hock of the right rear leg 24 of the dog.

As will be apparent, a loop 26 is formed from a middle portion of the cord 6 and extends rearwardly through the harness body strap D ring 16. The leash 2 is slidably attached to the loop 26.

The ends of the cord 6 are attached to their respective lower hind leg by adjustable loops 28 provided at the ends of the cord. A known fastening, such as is known, for example, in camping equipment, closes or tightens the loop in place above the hock. The loops 28 are each provided with a rubber sleeve member to protect the leg of the dog from injury. The loop is retained in position immediately above the hock by virtue of the fact that the dog's leg is larger in diameter immediately above and below the attachment point. Thus, the loop cannot slip upwardly or downwardly. It should be noted that the illustration shows the loops loosely attached to the animal for illustrative purposes only. In practice, the loops are snugly or firmly tightened in place.

In use, the harness 4 is positioned on the dog as shown in FIG. 1 utilizing the harness body and chest strap quick release devices. The two ends of the cord 6 are firmly secured above the respective hock portions of the lower hind legs 22, 24 of the dog. The cord loop 26 is pulled through the harness body portion D ring 16, and the leash 2 is attached to the cord loop 26. Thus, the running gear cord 6 extends substantially forwardly from the person holding the leash to the guide means D ring 16 and then substantially rearwardly via the pair of D rings 14 to the dog's hind legs immediately above the hock.

Attaching loops 28 just above the hock of the dog's leg(s) provides improved control and prevents the loops 28 slipping below the hocks thereby avoiding possible injury to the dog.

If the dog lunges or pulls, a reactive tensile force is applied to the running gear cord 6 via the leash 2 and this causes resistance of rearward movement of the dog's hind legs and/or causes a forwardly directed force to the legs, which in turn controls the dog's movements. These forces are transmitted in a damped manner due to the limited resilience of the cord 6 thereby ensuring the dog is not injured but also ensuring transmission of the force. Often, the dog will be caused to sit in response to its own pulling by virtue of the forwardly directed force which is applied to its rear legs. It will be appreciated that the reactive controlling force is directly proportional to the magnitude of the dog's own pulling.

The sliding engagement of the leash and the rearwardly extending loop of cord results in substantially equal forces being applied to each hind leg.

Slidable locking means, similar to those used on each hock engaging loop and which cannot pass forwardly through D-ring 16, could be provided on the rearwardly extending loop 26 to maintain a length of loop rearwardly of D-ring 16 to thereby selectively restrain the dog in a seated posture if necessary.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

What is claimed is:

1. Apparatus for assisting a person in controlling a dog having a chest and hind legs, the apparatus comprising:
    a body harness encircling the chest of the dog and including a dorsal guide means and a pair of lateral guide means;
    a cord extending substantially forwardly from the person controlling the dog to the dorsal guide means and then substantially downwardly to the lateral guide means and then substantially rearwardly to the dog's hind legs for attachment adjacent each of the hocks such that the pulling of the dog causes a substantially forwardly directed force to be applied to each of the dog's hind legs.

2. Apparatus as claimed in claim 1, wherein the increased application of the substantially forward directed force applied to each of the dog's hind legs will cause the dog to adopt a sitting posture.

3. Apparatus as claimed in claim 1, wherein a middle portion of the cord extends substantially rearwardly towards the person from the dorsal guide means.

4. Apparatus as claimed in claim 3, wherein the middle portion of the cord forms a loop and the loop is slidably held to substantially equalize forces on the hind legs of the dog.

5. Apparatus as claimed in claim 4, wherein locking means are provided on the rearwardly extending loop of cord to selectively restrain the dog in the seated posture.

6. Apparatus as claimed in claim 1, wherein the cord is resilient.

7. Apparatus as claimed in claim 1, wherein the body harness extends between the dorsal guide means and lateral guide means to protect the dog from abrasion by the cord.

8. A method for assisting a person in controlling a dog having a chest and hind legs, the method comprising the following steps:
    locating a body harness about the chest of the dog, the body harness including guide means;
    running a cord forward from the person to the guide means and then rearwardly to each rear leg of the dog to apply a forwardly directed force to each of the dog's hind legs in response to the dog lunging or pulling away from the person.

9. The method as claimed in claim 8 further comprising the step of increasing application of the forwardly directed force to each of the dog's hind legs causing the dog to adopt a sitting posture.

* * * * *